United States Patent
Eibergen et al.

(10) Patent No.: US 11,589,584 B2
(45) Date of Patent: Feb. 28, 2023

(54) SYNERGISTIC COMBINATION OF 1,3-BIS(HYDROXYMETHYL)-5,5-DIMETHYLIMIDAZOLIDINE-2,4-DIONE WITH GLYOXAL

(71) Applicant: MC (US) 3 LLC, Wilmington, DE (US)

(72) Inventors: Nora Eibergen, Wilmington, DE (US); Geert van der Kraan, Pfaeffikon (CH)

(73) Assignee: MC (US) 3 LLC, Wilmington, DE (US)

( * ) Notice: Subject to any disclaimer, the term of this patent is extended or adjusted under 35 U.S.C. 154(b) by 68 days.

(21) Appl. No.: 17/046,868

(22) PCT Filed: Mar. 20, 2019

(86) PCT No.: PCT/US2019/023082
§ 371 (c)(1),
(2) Date: Oct. 12, 2020

(87) PCT Pub. No.: WO2019/203977
PCT Pub. Date: Oct. 24, 2019

(65) Prior Publication Data
US 2021/0076678 A1   Mar. 18, 2021

Related U.S. Application Data

(60) Provisional application No. 62/657,954, filed on Apr. 16, 2018.

(51) Int. Cl.
*A01N 43/54* (2006.01)
*A01N 35/02* (2006.01)

(52) U.S. Cl.
CPC ............ *A01N 43/54* (2013.01); *A01N 35/02* (2013.01)

(58) Field of Classification Search
CPC ................................ A01N 43/54; A01N 35/02
See application file for complete search history.

(56) References Cited

U.S. PATENT DOCUMENTS

| | | |
|---|---|---|
| 4,680,127 A | 7/1987 | Edmondson |
| 2009/0088483 A1* | 4/2009 | Anker .................... A01N 35/02 514/705 |
| 2016/0100574 A1* | 4/2016 | Pesaro .................. A61Q 11/00 424/59 |
| 2017/0312190 A1 | 2/2017 | Gonazales et al. |
| 2020/0390102 A1* | 12/2020 | Van Der Kraan ..... A01N 35/02 |

* cited by examiner

*Primary Examiner* — Snigdha Maewall

(57) ABSTRACT

A synergistic antimicrobial composition having two components. The first component is 1,3-bis(hydroxymethyl)-5,5-dimethylimidazolidine-2,4-dione. The second component is a hydrogen sulfide scavenger, glyoxal.

3 Claims, No Drawings

SYNERGISTIC COMBINATION OF 1,3-BIS(HYDROXYMETHYL)-5,5-DIMETHYLIMIDAZOLIDINE-2,4-DIONE WITH GLYOXAL

This invention relates to combinations of functional chemicals, the combinations having greater antimicrobial activity than would be observed for the individual compounds.

Use of combinations of at least two compounds can broaden potential markets, reduce use concentrations and costs, and reduce waste. In some cases, commercial antimicrobial compounds cannot provide effective control of microorganisms, even at high use concentrations, due to weak activity against certain types of microorganisms, or relatively slow antimicrobial action, or instability under certain conditions such as high temperature and high pH. Combinations of different active agents are sometimes used to provide overall control of microorganisms or to provide the same level of microbial control at lower use rates in a particular end use environment. For example U.S. Pat. No. 4,680,127 discloses a method of scavenging hydrogen sulfide by the combination of glyoxal and formaldehyde. Additionally, U.S. Pat. No. 9,752,083 discloses compositions that may include DMDMH useful for the reduction of sulfhydryl compounds, but these references do not teach or suggest the synergistic combination claimed herein in the claimed ratios. Moreover, there is a need for additional combinations of functional chemicals having enhanced activity to provide effective control of the microorganisms. The problem addressed by this invention is to provide such additional combinations of functional chemicals.

STATEMENT OF THE INVENTION

The present invention is directed to a synergistic antimicrobial composition comprising: (a) 1,3-bis(hydroxymethyl)-5,5-dimethylimidazolidine-2,4-dione; and (b) glyoxal; wherein a weight ratio of 1,3-bis(hydroxymethyl)-5,5-dimethylimidazolidine-2,4-dione to glyoxal is from 1:1 to 1:20.

DETAILED DESCRIPTION OF THE INVENTION

As used herein, the following terms have the designated definitions, unless the context clearly indicates otherwise. The term "antimicrobial compound" refers to a compound capable of inhibiting the growth or propagation of microorganisms, and/or killing microorganisms; antimicrobial compounds include bactericides, bacteristats, fungicides, fungistats, algaecides and algistats, depending on the dose level applied, system conditions and the level of microbial control desired. The term "microorganism" includes, for example, fungi (such as yeast and mold), bacteria, archaea, and algae. The term "$H_2S$ scavenger" refers to a compound capable of reacting irreversibly with $H_2S/HS^-/S^{2-}$ species dissolved in the multiphase fluids and water-phases and thereby rendering the adverse effects of these components harmless as they are now bound. The following abbreviations are used throughout the specification: ppm=parts per million by weight (weight/weight), mL=milliliter. Unless otherwise specified, temperatures are in degrees centigrade (° C.), all range endpoints are inclusive and combinable, and references to percentages are by weight (wt %). Percentages of antimicrobial compounds in the composition of this invention are based on the total weight of active ingredients in the composition, i.e., the antimicrobial compounds themselves, exclusive of any amounts of solvents, carriers, dispersants, stabilizers or other materials which may be present. The term "DMDMH" is 1,3-Bis(hydroxymethyl)-5,5-dimethylimidazolidine-2,4-dione, an antimicrobial compound, CAS No. 6440-58-0. As used herein, "Glyoxal" is oxaldehyde, a hydrogen sulfide scavenger, CAS No. 107-22-2.

Preferably, a weight ratio of DMDMH to glyoxal is from 1:1 to 1:20, 1:1 to 1:3, 1:2.5 to 1:3.3, 1:7.5 to 1:15, or 1:20.

In some embodiments of the invention, the antimicrobial composition is substantially free of other antimicrobial compounds, i.e., it has less than 5% of other antimicrobial compounds relative to total biocide active ingredient content, alternatively less than 2%, alternatively less than 1%, alternatively less than 0.5%, alternatively less than 0.1%.

The compositions of this invention may contain other ingredients, e.g., defoamers and emulsifiers. The microbicidal compositions of the present invention can be used to inhibit the growth of microorganisms or higher forms of aquatic life (such as protozoans, invertebrates, bryozoans, dinoflagellates, crustaceans, mollusks, etc.) by introducing a microbicidally effective amount of the compositions into an aqueous medium subject to microbial attack. Suitable aqueous media are found in, for example: petroleum processing fluids; fuel; oil and gas field functional fluids, such as injection fluids, hydraulic fracturing fluids, produced fluids, drilling mud, completion and workover fluids; oil and gas pipelines, separation, refining, transportation, and storage system; industrial process water; electrocoat deposition systems; cooling towers; air washers; gas scrubbers; mineral slurries; wastewater treatment; ornamental fountains; reverse osmosis filtration; ultrafiltration; ballast water; evaporative condensers; heat exchangers; pulp and paper processing fluids and additives; starch; plastics; emulsions; dispersions; paints; latices; coatings, such as varnishes; construction products, such as mastics, caulks, and sealants; construction adhesives, such as ceramic adhesives, carpet backing adhesives, and laminating adhesives; industrial or consumer adhesives; photographic chemicals; printing fluids; household products, such as bathroom and kitchen cleaners; cosmetics; toiletries; shampoos; soaps; personal care products such as wipes, lotions, sunscreen, conditioners, creams, and other leave-on applications; detergents; industrial cleaners; floor polishes; laundry rinse water; metalworking fluids; conveyor lubricants; hydraulic fluids; leather and leather products; textiles; textile products; wood and wood products, such as plywood, chipboard, flakeboard, laminated beams, oriented strandboard, hardboard, and particleboard; agriculture adjuvant preservation; nitrate preservation; medical devices; diagnostic reagent preservation; food preservation, such as plastic or paper food wrap; food, beverage, and industrial process pasteurizers; toilet bowls; recreational water; pools; and spas.

The specific amount of the microbicidal compositions of this invention necessary to inhibit or control the growth or metabolic activity of microorganisms in an application will vary. Typically, the amount of the composition of the present invention is sufficient to control the growth or metabolic activity of microorganisms if it provides from 1 to 5000 ppm (parts per million) active ingredients of the composition. It is preferred that the combination of active ingredients (i.e., DMDMH and glyoxal) of the composition be present in the medium to be treated in an amount of at least 10 ppm, preferably at least 300 ppm, preferably at least 500 ppm, and preferably at least 1000 ppm. It is preferred that the active ingredients of the composition be present in the locus in an amount of no more than 5000 ppm, preferably no more than 2000 ppm, preferably no more than 1000 ppm, preferably no more than 500 ppm, preferably no more than 300 ppm. In a method of this invention, a composition is treated to control microbial growth or metabolic activity by adding, together DMDMH and glyoxal in amounts that would produce the concentrations indicated above.

The present invention also encompasses a method for preventing microbial growth in the use areas described above, especially in oil or natural gas production operations, by incorporating the claimed biocide combination into the materials. Alternatively, a method for controlling growth of microorganisms comprises treatment of a medium which may contain bacteria with a combination of DMDMH and glyoxal in a range from 1:1.4 to 1:20.8, respectively, preferably from 1:1.4 to 1:7.5.

EXAMPLES

Example 1: Synergy in the Planktonic Phase

*Pseudomonas aeruginosa* (ATCC 8739) and *Escherichia coli* (ATCC 10145) cultures were separately prepared from glycerol stocks. First they were streak plated and validated with a microscope. Single colonies were picked and used to inoculate 200 mL shake flasks that were grown statically overnight at 30° C. (30 grams/L Tryptic Soy Broth) to produce the initial inoculum of mixed microorganism culture. A deep-well 96 well challenge plate (2 mL maximum well volume) was prepared using 900 μL/well phosphate buffer at pH 7.3, (0.0027M potassium chloride, 0.137 M sodium chloride). Inoculation took place at the start of the experiments (with a 100 μL combined inoculum, adding to the 900 μL buffer to total 1 mL/well). The inoculum added between $1*10^8$ and $1*10^9$ total cells/mL based on $OD_{600}$ measurement. The concentrations (in ppm) used for the synergy experiments are as follows: DMDMH—0, 60, 120, 180, 240, 300, 360, 420; glyoxal—0, 300, 600, 900, 1200, 1500, 1800, 2100. Each experiment was done in triplicate.

The inoculated assay block was challenged at 30° C. for 48 hours. After the 48 hour challenge with biocide under static conditions, 20 μL aliquots of each treatment (well) were transferred to corresponding wells of a 96 well plate filled with 180 μL per well of 'recovery' media (30 grams/L Tryptic Soy Broth). This was done in triplicate for each point (the triplicate is already present in the biocide block viz. each point is truly determined in triplicate). After pipetting the plates, they were sealed with a titer top and incubated at 30° C. in a non-shaking incubator.

The recovery plates were subsequently read (checked for microbial growth) at 72 hours after addition of the culture, to recovery media. Ranking of biocidal efficacy was done by recording the development of turbidity within each well (determined by visual inspection). A development of turbidity indicated the growth of cells and the failure of the biocidal formulation in question. Ranking was done per average value of three data points determined per experiment. (Recorded in log regrowth).

Synergy Ratio Determined Using the Following Formulae.

Table 1 summarizes the efficacy of DMDMH and glyoxal and their combinations, as well as the Synergy Index of each combination. one measure of synergism is the industrially accepted method described by Kull, F. C.; Eisman, P. C.; Sylwestrowicz, H. D. and Mayer, R. L., in Applied Microbiology 9:538-541 (1961), using the ratio determined by the formula:

$$Qa/QA+Qb/QB=\text{Synergy Index ("SI")}$$

Wherein:
Qa=Concentration of biocide A required to achieve a certain level of kill when used in combination with B
QA=Concentration of biocide A required to achieve a certain level of kill when used alone
Qb=Concentration of biocide B required to achieve a certain level of kill when used in combination with A
QB=Concentration of biocide B required to achieve a certain level of kill when used alone
When the sum of Qa/QA and Qb/QB is greater than 1.0, antagonism is indicated. When the sum is 1.0, additivity is indicated, and when less than 1.0, synergism is demonstrated.

TABLE 1

Summarized synergy values against microorganisms, determined after 48 hours

| Bacterial system | Ratio DMDMH/ Glyoxal | DMDMH standalone 48 h pass (ppm) | Glyoxal standalone 48 h pass (ppm) | DMDMH in formulation 48 h pass (ppm) | Glyoxal in formulation 48 h pass (ppm) | Synergy index |
|---|---|---|---|---|---|---|
| P. aeruginosa/ E. coli | 1:1 | 420 | 1800 | 300 | 300 | 0.88 |
| P. aeruginosa/ E. coli | 1:1.3 | 420 | 1800 | 240 | 300 | 0.74 |
| P. aeruginosa/ E. coli | 1:1.6 | 420 | 1800 | 180 | 300 | 0.63 |
| P. aeruginosa/ E. coli | 1:2.5 | 420 | 1800 | 240 | 600 | 0.90 |
| P. aeruginosa/ E. coli | 1:3.3 | 420 | 1800 | 180 | 600 | 0.76 |
| P. aeruginosa/ E. coli | 1:7.5 | 420 | 1800 | 120 | 900 | 0.81 |
| P. aeruginosa/ E. coli | 1:15 | 420 | 1800 | 60 | 900 | 0.79 |
| P. aeruginosa/ E. coli | 1:20 | 420 | 1800 | 60 | 1200 | 0.81 |

The invention claimed is:

1. A synergistic antimicrobial composition comprising: (a) 1,3-bis(hydroxymethyl)-5,5-dimethylimidazolidine-2,4-dione; and (b) glyoxal; wherein a weight ratio of 1,3-bis(hydroxymethyl)-5,5-dimethylimidazolidine-2,4-dione to glyoxal is from 1:1 to 1:20.

2. The synergistic composition of claim 1 wherein the composition is synergistic against a microorganism.

3. A method for inhibiting growth of bacteria comprising adding to a medium which contains bacteria and a combination of 1,3-bis(hydroxymethyl)-5,5-dimethylimidazolidine-2,4-dione and glyoxal in a range from 1:1 to 1:20.

* * * * *